(12) United States Patent
Ebi et al.

(10) Patent No.: US 7,442,467 B2
(45) Date of Patent: Oct. 28, 2008

(54) SEALED BATTERY

(75) Inventors: Ryuichiro Ebi, Osaka (JP); Kenjin Masumoto, Nishinomiya (JP); Toshiharu Kitagawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 412 days.

(21) Appl. No.: 10/556,131

(22) PCT Filed: Mar. 31, 2004

(86) PCT No.: PCT/JP2004/004580

§ 371 (c)(1), (2), (4) Date: Nov. 9, 2005

(87) PCT Pub. No.: WO2004/105159

PCT Pub. Date: Dec. 2, 2004

(65) Prior Publication Data

US 2006/0286451 A1 Dec. 21, 2006

(30) Foreign Application Priority Data

May 20, 2003 (JP) ............................. 2003-142143

(51) Int. Cl.
*H01M 2/08* (2006.01)
(52) U.S. Cl. ..................................... 429/174; 429/185
(58) Field of Classification Search ................. 429/174, 429/185
See application file for complete search history.

(56) References Cited

U.S. PATENT DOCUMENTS 4,309,493 A * 1/1982 Kühl et al. ............... 429/174 X

| 6,524,739 | B1 | 2/2003 | Iwaizono et al. |
| 6,946,219 | B2 | 9/2005 | Hamada et al. |
| 2004/0248002 | A1 | 12/2004 | Asahina et al. |
| 2005/0153194 | A1 | 7/2005 | Kimur et al. |

FOREIGN PATENT DOCUMENTS

| JP | 7-201308 | 8/1995 |
| JP | 8-162076 | 6/1996 |
| JP | 2000-357495 | 12/2000 |
| JP | 2001-283795 | 10/2001 |
| JP | 2003-007270 | 1/2003 |

OTHER PUBLICATIONS

English language Abstract of JP 8-162076, Jun. 1996.
English language Abstract of JP 2000-357495, Dec. 2000.
English language Abstract of JP 7-201308, Aug. 1995.
English language Abstract of JP 2001-283795, Oct. 2001.
English language Abstract of JP 2003-007270, Jan. 2003.

* cited by examiner

*Primary Examiner*—Stephen J. Kalafut
(74) *Attorney, Agent, or Firm*—Greenblum & Bernstein, P.L.C.

(57) ABSTRACT

A sealed battery in which an opening of a battery case is sealed with any one of a sealing member via an insulating gasket, and a sealing unit in which a sealing member is crimped inside a filter via an inner gasket. The sealed battery includes a sheet-like gasket placed upon the sealing member so that the battery case is tightly sealed with any one of a combination of the insulating gasket and the sheet-like gasket, and a combination of the insulating gasket, the sheet-like gasket, and the inner gasket, by crimping the opening of the battery case inwards. This secures sufficient space for the compressing while the crimp-sealing is achieved.

2 Claims, 4 Drawing Sheets

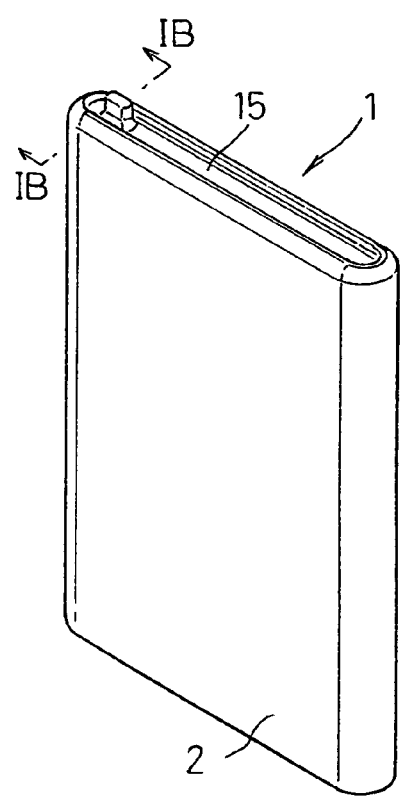
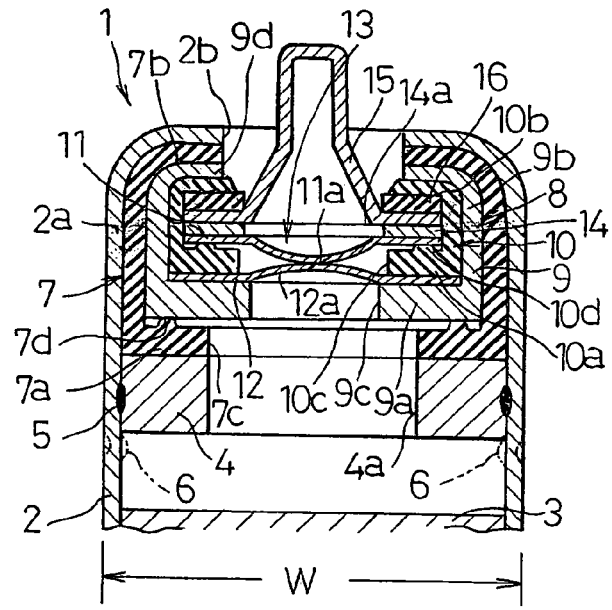

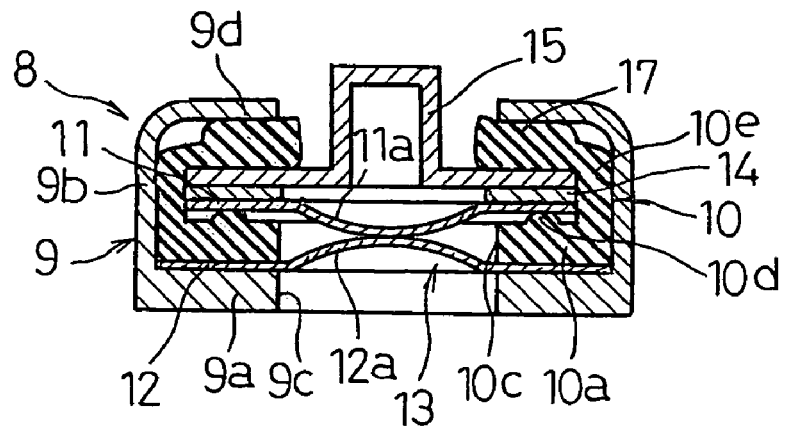
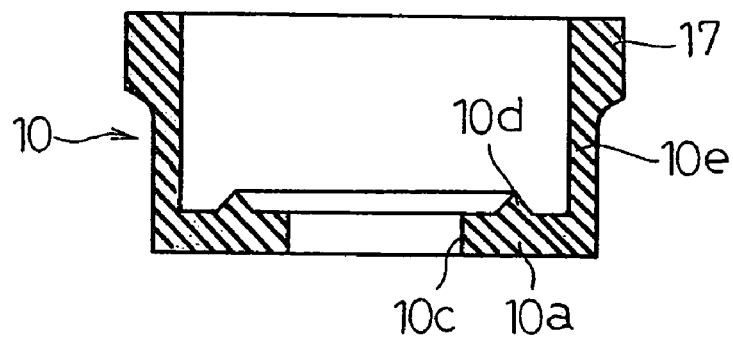
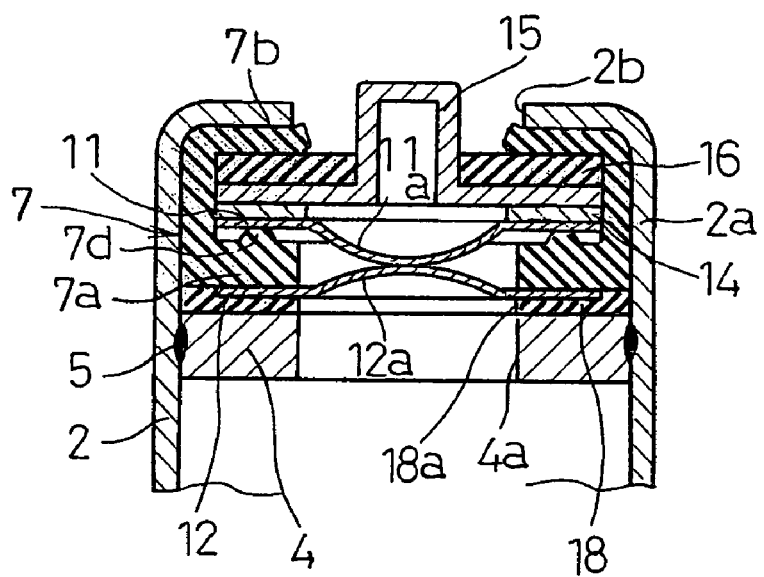

SEALED BATTERY

TECHNICAL FIELD

The present invention relates to a sealed battery and more particularly to a crimp-sealed battery with excellent leakage resistance.

BACKGROUND ART

With the remarkable development of small, thin, and high-functionality portable electronic equipment in recent years, there is a growing demand for smaller, thinner, and high-capacity batteries as their power source. Lithium batteries are effectively used for this purpose because they can be designed small with high capacity, and in particular, flat prismatic lithium ion rechargeable batteries are suitable in making the equipment thinner, for which they have been increasingly used as the repeatedly usable battery for portable electronic equipment such as mobile phones.

Meanwhile, various structures for sealing a prismatic sealed battery have been known, in which a sealing member is placed via a gasket at the opening of a battery case, and the opening of the battery case is crimped inwards to seal the case while compressing the gasket (for example, see Japanese Patent Laid-Open Publications Nos. Hei 8-162076 and 2000-357495).

One example of the structure of this type of a sealed battery is described with reference to FIG. 6: The battery case 21 accommodates elements for electromotive force 22 composed of an electrode plate assembly and liquid electrolyte. An annular groove is formed in the outer face at a predetermined position from the top end of the opening 21a of the battery case 21, and a holder plate 24 formed with an aperture 24a is welded to be fixed onto an annular support 23 that is formed by the annular groove protruding inwards. A plate 26 is placed upon the holder plate 24 via an insulating gasket 25, and one electrode of the elements for electromotive force 22 is connected to the plate 26 through a lead 27, while a cap 28 that serves as an external connection terminal is placed on and electrically connected to the sealing plate 26. The top end of the opening 21a of the battery case 21 is crimped inwards in this state so as to secure the plate 26 via the insulating gasket 25 and to seal the case. The insulating gasket 25 is square tubular and includes a bottom wall 25a that makes contact with the lower face of the plate 26 and a top wall 25b that makes contact with the inner periphery of the opening 21a of the battery case 21, the bottom wall 25a having an aperture 25c that matches the aperture 24a of the holder plate 24 and an annular sealing protrusion 29 along the outer periphery in the inner surface thereof. The plate 26 is formed with a thin part 26a that breaks when the internal pressure of the battery rises, and the cap 28 that serves as the external connection terminal is formed with a gas outlet hole 28a.

A battery with a sealing unit 30 instead of the plate 26 of FIG. 6, as shown in FIG. 7, is also known. The sealing unit 30 includes a filter 31 and an inner gasket 32 placed inside the filter, the inner gasket being square tubular and including a bottom wall 32a, a top wall 32b, and an aperture 32c formed in the bottom wall 32a. A safety mechanism 35 is further provided, which consists of a pair of an upper valve 33 and a lower valve 34 respectively disposed above and below the bottom wall 32a of the inner gasket 32, the pair of valves having cup-shaped parts 33a and 34a that are connected to each other at their middle parts within the aperture 32c. The cup-shaped part 34a of the lower valve breaks when the internal pressure of the battery rises, which causes the cup-shaped part 33a of the upper valve to be inverted to cut off the current path. Upon the safety mechanism 35 are placed a PTC element 36 and a cap 37 that serves as an external connection terminal. The opening 31a of the filter 31 is crimped inwards in this state so as to secure the cap 37, the PTC element 36, and the safety mechanism 35 via the inner gasket 32 to complete the sealing unit 30.

The structures shown in FIG. 6 and FIG. 7, however, have the following problems: In a thin battery with a small thickness W of the battery case 21, the thickness of the top wall 25b of the insulating gasket 25, or of the top walls 25b and 32b of the insulating gasket 25 and the inner gasket 32, which will be the compressed point, cannot be made sufficiently large. This means sufficient space necessary for the compressing is not available when crimping the opening 21a of the battery case 21, or the openings 21a and 31a of the battery case 21 and the filter 31, inwards to compress the insulating gasket 25, or the insulating gasket 25 and the inner gasket 32, between the opening and the top face of the cap 28 or 37 that serves as the external connection terminal. Sufficient space necessary for the compressing is not available even when the dimension d1 between the annular support 23 and the top end face of the battery case 21, or the dimension d1 and the dimension d2 between the upper end face and the lower end face of the filter 31 are controlled when crimping the battery case 21, or the battery case 21 and the filter 31. It is therefore often the case that sealing properties are not satisfactory, resulting in low reliability in respect of leakage resistance.

In view of the above-described problems in the conventional technique, an object of the present invention is to provide a sealed battery which has high sealing properties with a simple and low-cost structure even in a thin design and which is highly reliable in respect of leakage resistance.

DISCLOSURE OF THE INVENTION

To solve the above problems, the present invention provides a sealed battery in which an opening of a battery case is sealed, with any one of a sealing member via an insulating gasket, and a sealing unit in which a sealing member is crimped inside a filter via an inner gasket, the sealed battery including a sheet-like gasket placed upon the sealing member so that the battery case is tightly sealed with any one of a combination of the insulating gasket and the sheet-like gasket, and a combination of the insulating gasket, the sheet-like gasket, and the inner gasket, by crimping the opening of the battery case inwards.

With this structure, to form a thin sealed battery, although the thickness of the insulating gasket or the inner gasket that is crimped with the corresponding top end of either the opening of the battery case or the filter of the sealing unit cannot be made large, the sheet-like gasket is interposed in the part that will be a compressed point between the sealing member and the top end of either the opening of the battery case or the filter, and therefore the overall space for compressing these gaskets is made larger. Thus a necessary level of sealing properties is achieved even when there are some crimping errors, and high reliability is achieved in respect of leakage resistance.

When the sheet-like gasket is made of a material having a higher coefficient of rebound resilience than the insulating gasket or the insulating gasket and the inner gasket, the sealing properties are further improved. Although the material that has a high coefficient of rebound resilience is expensive, it does not cause much cost because no large amount of material would be wasted to produce sheet-like gaskets as compared to the molding of the insulating gasket or the insulating gasket and the inner gasket in which a large amount of material is wasted for molding.

The thickness of the upper face of the insulating gasket or the inner gasket crimped and accommodated inside the filter may be made larger, in which case such a thick portion will provide the same function as the above-mentioned sheet-like gasket and provides the same effects when the opening of the battery case is tightly sealed with the insulating gasket or with the insulating gasket and the inner gasket by crimping the opening of the battery case inwards.

Further, an annular sealing protrusion may be provided at a compressed point during the crimping process of the insulating gasket and/or the inner gasket, and a sheet-like gasket having a higher coefficient of rebound resilience than these gaskets may be placed upon the sealing protrusion, so that the sheet-like gasket having a high coefficient of rebound resilience is compressed by the sealing protrusion in the bottom wall of the insulating gasket and/or the inner gasket, whereby deformation of the sealing protrusion is prevented even if the battery is stored for a long time under severe conditions such as high temperatures, and a sufficient level of sealing pressure resistance is achieved.

BRIEF DESCRIPTION OF THE DRAWINGS

FIG. 1A and FIG. 1B show a sealed battery of a first embodiment of the present invention, in which FIG. 1A is an overall perspective view and FIG. 1B is an enlarged longitudinal cross-sectional side elevation viewed from the direction of the arrows IB-IB of FIG. 1A.

FIG. 2A and FIG. 2B show a sealing unit of a sealed battery of a second embodiment of the present invention, in which FIG. 2A is a longitudinal cross-sectional side view, and FIG. 2B is a longitudinal cross-sectional side view illustrating an inner gasket before it is crimped.

FIG. 3 is a longitudinal cross-sectional side view showing major parts of a sealed battery of a third embodiment of the present invention.

BEST MODE FOR CARRYING OUT THE INVENTION

First Embodiment

Figure 4:
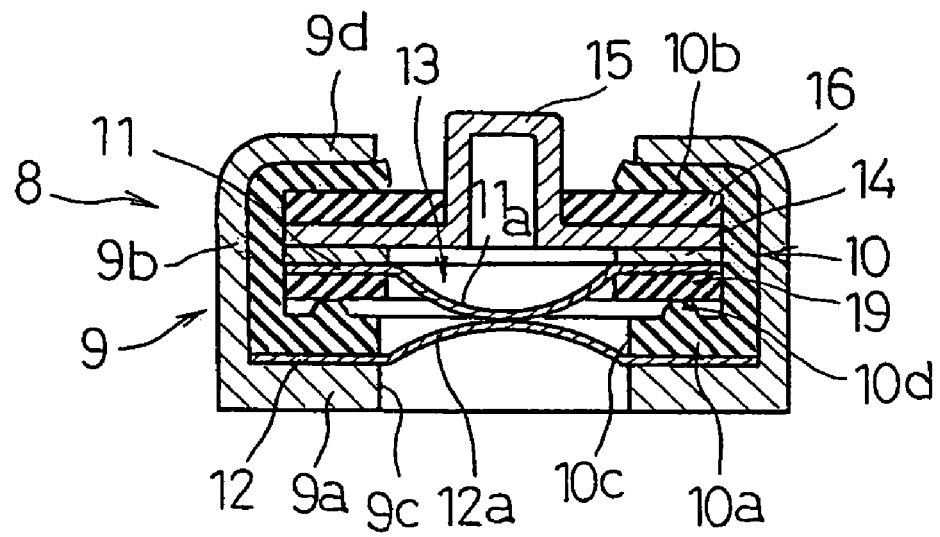
FIG. 4 is a longitudinal cross-sectional side view showing a sealing unit of a sealed battery of a fourth embodiment of the present invention.

A sealed battery of a first embodiment of the present invention will be described below with reference to FIG. 1A and FIG. 1B.

Referring to FIG. 1A and FIG. 1B, 1 is a flat prismatic sealed battery structured as a lithium ion rechargeable battery, its battery case 2 accommodating elements for electromotive force 3 inside, which consist of an electrode plate assembly stacked positive and negative electrodes with a separator interposed therebetween and liquid electrolyte. An annular groove is formed in the outer face at a predetermined position from the top end 2b of the opening 2a of the battery case 2, and a holder plate 4 formed with an aperture 4a is welded at 5 to be fixed onto an annular support 6 that is formed by the annular groove protruding inwards.

A sealing unit 8 is placed upon the holder plate 4 via an insulating gasket 7, and the opening 2a of the battery case 2 is crimped inwards in this state, so that the opening is sealed, the sealing unit being insulated from the battery case 2 by the insulating gasket 7. The insulating gasket 7 is a molded piece of plastic such as PP or PE and has a square tubular shape which includes a bottom wall 7a that makes contact with the upper face of the holder plate 4 and the lower face of the sealing unit 8 and a top wall 7b that makes contact with the inner periphery of the opening 2a of the battery case 2, the bottom wall 7a having an aperture 7c that matches the aperture 4a of the holder plate 4 and an annular sealing protrusion 7d along the outer periphery on the upper face of the bottom wall 7a.

The sealing unit 8 includes a square tubular metal filter 9 having a bottom wall 9a and a circumferential wall 9b, the bottom wall 9a being formed with an aperture 9c, and the filter 9 is connected to one electrode of the elements for electromotive force 3 with a lead (not shown). The other electrode of the elements for electromotive force 3 is connected to the battery case 2. Inside the filter 9 is placed a square tubular, insulating inner gasket 10 having a bottom wall 10a and a top wall 10b, the bottom wall 10a being formed with an aperture 10c. The inner gasket 10 is a molded piece of low-cost plastic such as PP or PE.

A safety mechanism 13 is provided, which consists of a pair of an upper valve 11 and a lower valve 12 respectively disposed above and below the bottom wall 10a of the inner gasket 10, the pair of valves having cup-shaped parts 11a and 12a that are connected to each other at their middle parts within the aperture 10c. The safety mechanism 13 is structured such that, when the internal pressure of the battery rises, the cup-shaped part 12a of the lower valve breaks and the cup-shaped part 11a of the upper valve is inverted to cut off the current path, to let out the internal pressure to the outside through a gas outlet hole (not shown) provided in the cap 15 that serves as an external connection terminal. The inner gasket 10 includes an annular sealing protrusion 10d protruded along the outer periphery on the upper face of the bottom wall 10a such as to make pressure contact with the lower face of the upper valve 11.

Upon the safety mechanism 13 are placed, as part of the sealing member, a PTC element 14 having an aperture 14a and the cap 15 that serves as the external connection terminal, and a sheet-like gasket 16 is placed upon these. This sheet-like gasket 16 may be a plastic sheet made of PP or PE, but is preferably a sheet of plastic that has a high coefficient of rebound resilience such as polytetrafluoroethylene (PTFE) or perfluoroalcoxy alkane (PFA).

The sealing unit 8 is formed by placing the inner gasket 10, the safety mechanism 13, the PTC element 14, the cap 15 that serves as the external connection terminal, and the sheet-like gasket 16 inside the filter 9, and by crimping the opening 9d of the filter 9 inwards to secure these elements. The cap 15 is electrically connected to one electrode of the elements for electromotive force 3 through the PTC element 14, the safety mechanism 13, the filter 9, and a lead (not shown).

With this structure, to form a thin sealed battery 1 having a small thickness W, the thickness of the top wall 10b of the inner gasket 10, which makes contact with the circumferential wall 9b of the filter 9 in the sealing unit 8 and which will be a compressed point, may be made as small as about 0.1 to 0.2 mm. Because of the sheet-like gasket 16 which has almost the same thickness of 0.1 to 0.2 mm as that of the top wall 10b of the inner gasket 10 and which is interposed between the cap 15 and the top wall 10b of the inner gasket 10, the overall space for compressing the gasket is made larger during the crimping of the opening 9d of the filter 9. Therefore, when the opening 9d of the filter 9 is crimped, a necessary level of sealing properties is achieved even when there are some crimping errors in the opening 9d of the filter 9, and thus high reliability is achieved in respect of leakage resistance.

The sealing properties are further improved, in particular, by using PTFE or PFA for the sheet-like gasket 16, which has a higher coefficient of rebound resilience than the inner gasket 10, and although these types of materials are expensive, it does not cause much cost because no large amount of material would be wasted for the molding of the sheet-like gasket, as compared to molding the inner gasket 10 using such a material.

The coefficient of rebound resilience of the sheet-like gasket 16 is preferably in the range of from twice to five times higher than that of the insulating gasket, or the insulating gasket and the inner gasket, from the viewpoints of desirable leakage resistance and feasible thickness.

In the above example, the sheet-like gasket 16 is placed upon the cap 15 in the sealing unit 8 so that the top wall 10b of the inner gasket 10 and the sheet-like gasket 16 are superposed at the compressed point between the opening 9d of the filter 9 and the cap 15. Alternatively, another similar sheet-like gasket may be placed upon the sealing unit 8, so that the top wall 7b of the insulating gasket 7 and the sheet-like gasket are superposed at the compressed point between the opening 2a of the battery case 2 and the sealing unit 8.

Second Embodiment

Next, a sealed battery of a second embodiment of the present invention will be described with reference to FIG. 2A and FIG. 2B. In the following description of the embodiment, the same constituent elements of the previous embodiment are given the same reference numerals and will not be described again. The difference only will be mainly described.

In the sealing unit 8 of this embodiment, the inner gasket 10 is formed with a thick portion 17 protruded radially outwards further than the side wall 10e of the inner gasket 10 as shown in FIG. 2B in the part that makes contact with the upper face of the cap 15. The thick portion 17 functions the same when it is protruded radially inwards, but such a radially inward protrusion makes it difficult to place the upper valve 11, the PTC element 14, and the cap 15, and therefore the thick portion is preferably formed to protrude radially outwards.

The thickness of the protruded thick portion 17 is preferably in the range of from 1.2 to 2.5 times larger than that of the side wall 10e from the viewpoints of desirable leakage resistance and feasible thickness.

With this structure, too, the thick portion 17 provides the same function as the above-described sheet-like gasket 16 and provides the same effects.

Third Embodiment

Next, a sealed battery of a third embodiment of the present invention will be described with reference to FIG. 3.

In the description of the above embodiments, examples have been shown in which the opening of the battery case 2 is sealed with a sealing unit 8 via an insulating gasket 7, while, in this embodiment, a PTC element 14 and a cap 15 are placed as sealing members inside an insulating gasket 7 instead of the sealing unit 8, and a sheet-like gasket 16 is placed on the upper face of the cap 15.

A safety mechanism 13 is further provided, which consists of a pair of an upper valve 11 and a lower valve 12 respectively disposed above and below the bottom wall 7a of the insulating gasket 7, the pair of valves having cup-shaped parts 11a and 12a that are connected to each other at their middle parts within the aperture 7c, and an insulating plate 18 is interposed upon the holder plate 4 for insulation between the holder plate and the lower valve 12. The insulating plate 18 is formed with an aperture 18a that matches the aperture 4a. In this state, the top end of the opening 2a of the battery case 2 is crimped.

In this embodiment, too, the sheet-like gasket 16 and the top wall 7b of the insulating gasket 7 are superposed between the top end of the opening 2a of the battery case 2 and the cap 15 provided as a sealing member, whereby the overall space for compressing the gasket at the compressed point is made larger, and a necessary level of sealing properties is achieved even when there are some crimping errors in the opening 2a of the battery case 2, and thus high reliability is achieved in respect of leakage resistance.

Fourth Embodiment

Next, a sealed battery of a fourth embodiment of the present invention will be described with reference to FIG. 4.

In the sealing unit 8 of this embodiment, an annular sealing protrusion 10d is protruded along the outer periphery on the upper face of the bottom wall 10a of the inner gasket 10, and a sheet-like gasket 19 having a higher coefficient of rebound resilience than that of the inner gasket 10 is placed on the upper face of this bottom wall 10a. Upon this sheet-like gasket 19 is placed the upper valve 11 of the safety mechanism 13, and on it a PTC element 14 and a cap 15 as sealing members, and a sheet-like gasket 16 are placed.

In this state, the opening 2b of the battery case 2 is crimped inwards, so that, as with the first embodiment, the opening is sealed while the top wall 10b of the inner gasket 10 and the sheet-like gasket 16 are compressed between the opening 2b and the upper face of the cap 15, and further, the sheet-like gasket 19 having a high coefficient of rebound resilience is compressed by the sealing protrusion 10d of the bottom wall 10a of the inner gasket 10 between the PTC element 14 and the bottom wall 9a of the filter 9.

Thus, with this embodiment, in addition to the effects achieved in the first embodiment, high sealing properties are ensured by the sheet-like gasket 19 having a high coefficient of rebound resilience that is interposed at the compressed point between the PTC element 14 provided as a sealing member and the opposing annular sealing protrusion 10d protruded on the bottom wall 10a of the inner gasket 10, whereby deformation of the sealing protrusion 10d is prevented even if the battery is stored for a long time under severe conditions such as high temperatures, and a sufficient level of sealing pressure resistance is achieved.

While one example has been shown in this embodiment wherein the sheet-like gasket 19 under the PTC element 14 is used together with the sheet-like gasket 16 upon the cap 15, the same effects are achieved when the sheet-like gasket 19 only is provided.

Fifth Embodiment

Figure 5:
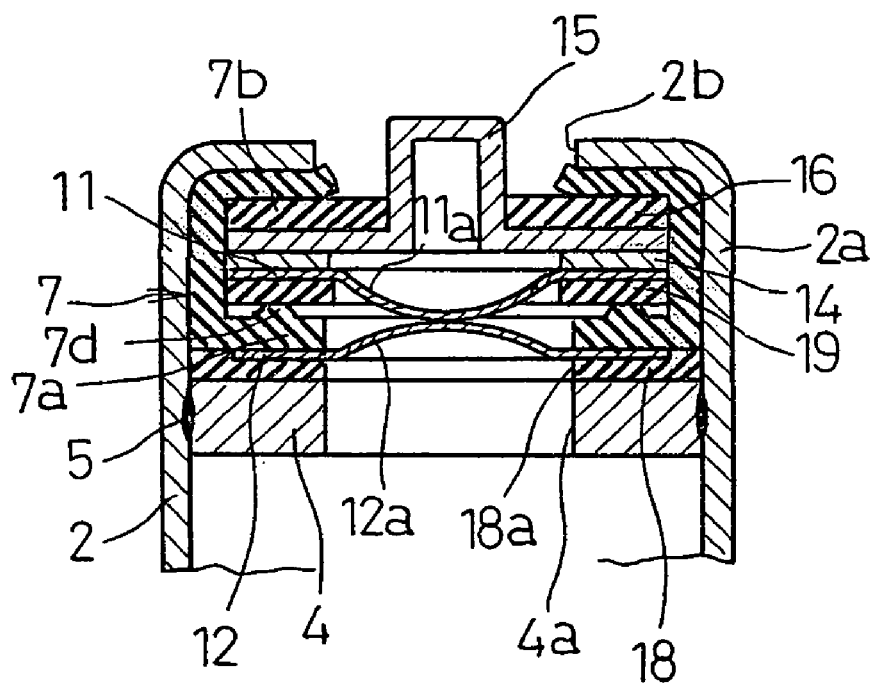
FIG. 5 is a longitudinal cross-sectional side view showing major parts of a sealed battery of a fifth embodiment of the present invention.
Figure 6:
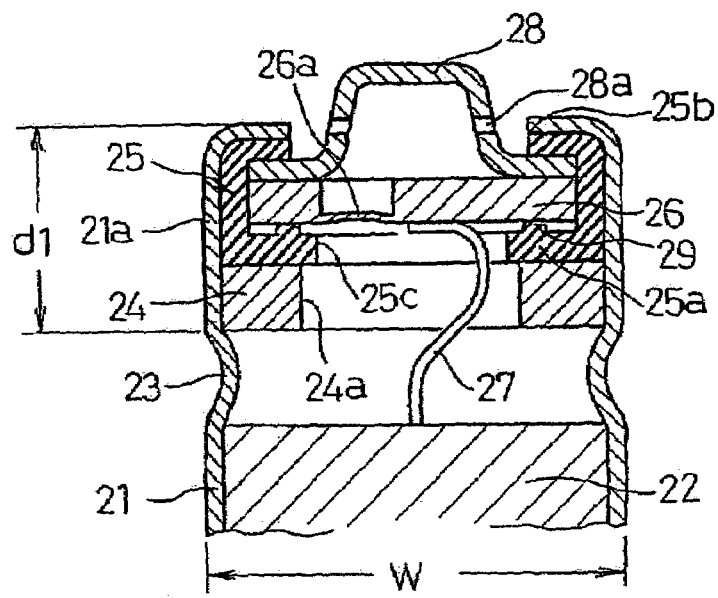
FIG. 6 is a longitudinal cross-sectional side view showing major parts of a conventional sealed battery.
Figure 7:
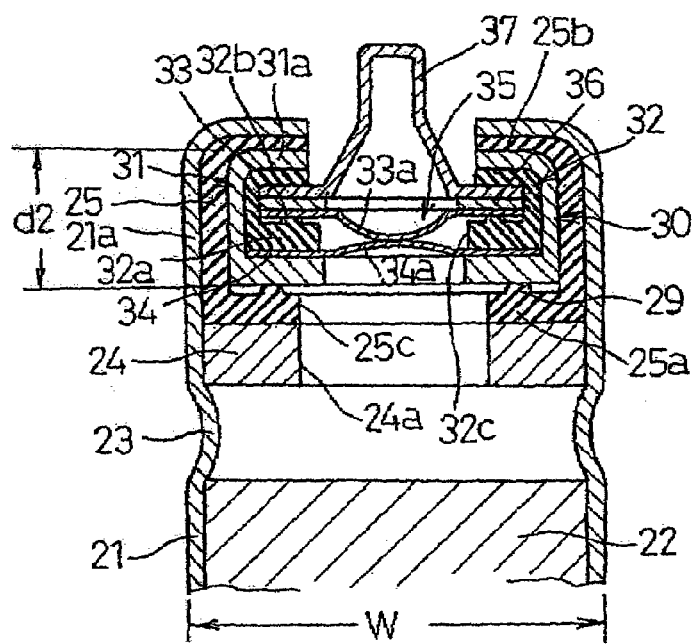
FIG. 7 is a longitudinal cross-sectional side view showing major parts of another conventional sealed battery.

Next, a sealed battery of a fifth embodiment of the present invention will be described with reference to FIG. 5.

In the above-described fourth embodiment, as with the first embodiment, a sheet-like gasket 19 is provided in the structure wherein the opening 2a of the battery case 2 is sealed with a sealing unit 8 via an insulating gasket 7, while, in this embodiment, as with the third embodiment, an annular sealing protrusion 7d is protruded along the outer periphery on the upper face of the bottom wall 7a of the insulating gasket 7, and a sheet-like gasket 19 having a higher coefficient of rebound resilience than that of the insulating gasket 7 is placed on the upper face of this bottom wall 7a, in the sealing structure wherein a PTC element 14 and a cap 15 as sealing members are placed inside the insulating gasket 7 instead of the sealing unit 8.

In this embodiment, too, as with the fourth embodiment, high sealing properties are ensured by the sheet-like gasket 19 having a high coefficient of rebound resilience that is interposed between the PTC element 14 provided as a sealing member and the opposing annular sealing protrusion 7d protruded on the bottom wall 7a of the insulating gasket 7, whereby deformation of the sealing protrusion 7d is prevented even if the battery is stored for a long time under severe conditions such as high temperatures, and a sufficient level of sealing pressure resistance is achieved.

INDUSTRIAL APPLICABILITY

As described above, according to the sealed battery of the present invention, in sealing the opening of the battery case with any one of a sealing member via an insulating gasket, and a sealing unit in which the sealing member is crimped inside a filter via an inner gasket, a sheet-like gasket is placed upon the sealing member, so that any one of a combination of the insulating gasket and the sheet-like gasket, and a combination of the insulating gasket, the sheet-like gasket, and the inner gasket, is interposed when crimping the opening of the battery case inwards to tightly seal the battery, whereby the overall space for compressing the gasket is made large and a necessary level of sealing properties is achieved even when there are some crimping errors, and high reliability is achieved in respect of leakage resistance.

The invention claimed is:

1. A sealed battery in which an opening of a battery case is sealed with a sealing member via an insulating gasket, and a sealing unit in which the sealing member is crimped inside the battery case via at least the sealing unit having at least a filter and an inner gasket, the sealed battery further including a sheet-like gasket having a higher coefficient of rebound resilience than the insulating gasket and the inner gasket, the sheet-like gasket being placed upon the sealing member so that the battery case is tightly sealed at the opening of the battery case with a combination of the insulating gasket, the sheet-like gasket, and the inner gasket, wherein the insulating gasket, the sheet-like gasket, and the sealing unit are crimped inwardly, and wherein the sheet-like gasket is provided between an upper face of the sealing member and a lower face of the insulating gasket; and an annular sealing protrusion provided at a compressed point on an upper face of a bottom wall of at least one of the insulating gasket and the inner gasket provided at a lower side of the sheet-like gasket.

2. A sealed battery in which an opening of a battery case is sealed with a sealing member via an insulating gasket, and a sealing unit in which the sealing member is crimped inside the battery case via at least the sealing unit having at least a filter and an inner gasket, the sealed battery further including a sheet-like gasket having a higher coefficient of rebound resilience than the insulating gasket and the inner gasket, wherein a thickness of an upper face of the insulating gasket and the inner gasket in a part that makes contact with an upper surface of a cap is made larger so that the battery case is tightly sealed at the opening of the battery case with a combination of the insulating gasket, the sheet-like gasket, and the inner gasket, wherein the insulating gasket, the sheet-like gasket, and the sealing unit are crimped inwardly, and wherein the sheet-like gasket is provided between an upper face of the sealing member and a lower face of the insulating gasket; and an annular sealing protrusion provided at a compressed point on an upper face of a bottom wall of at least one of the insulating gasket and the inner gasket provided at a lower side of the sheet-like gasket.

* * * * *